US009047800B2

(12) United States Patent
Yepez

(10) Patent No.: US 9,047,800 B2
(45) Date of Patent: Jun. 2, 2015

(54) METHODS FOR EXTERNAL DISPLAY RESOLUTION SELECTION

(75) Inventor: Roberto G. Yepez, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 321 days.

(21) Appl. No.: 13/397,635

(22) Filed: Feb. 15, 2012

(65) Prior Publication Data

US 2013/0207979 A1 Aug. 15, 2013

(51) Int. Cl.
*G06T 5/00* (2006.01)
*G09G 5/00* (2006.01)

(52) U.S. Cl.
CPC ............ *G09G 5/005* (2013.01); *G09G 2360/02* (2013.01); *G09G 2370/042* (2013.01); *G09G 2370/047* (2013.01)

(58) Field of Classification Search
USPC ......... 345/619, 536, 698, 571; 710/8; 307/80; 715/722
See application file for complete search history.

(56) References Cited

U.S. PATENT DOCUMENTS

| | | | | |
|---|---|---|---|---|
| 7,158,094 | B2 | 1/2007 | Wilks | |
| 8,407,594 | B2 * | 3/2013 | Shintani et al. | 715/722 |
| 2002/0135605 | A1 * | 9/2002 | Kim | 345/698 |
| 2002/0188770 | A1 * | 12/2002 | Kehlet | 710/8 |
| 2009/0309886 | A1 | 12/2009 | Sneed | |
| 2011/0063315 | A1 * | 3/2011 | Ghosh | 345/536 |
| 2011/0164184 | A1 * | 7/2011 | Avkarogullari et al. | 348/571 |
| 2012/0032783 | A1 | 2/2012 | Ahn et al. | |
| 2012/0080954 | A1 * | 4/2012 | Gachon et al. | 307/80 |
| 2012/0200593 | A1 * | 8/2012 | Todd et al. | 345/619 |

FOREIGN PATENT DOCUMENTS

| | | |
|---|---|---|
| TW | I304967 | 1/2009 |
| TW | 201017521 | 5/2010 |
| TW | I344106 | 6/2011 |
| TW | 201133433 | 10/2011 |

OTHER PUBLICATIONS

Extron Electronic, "Understanding EDID—Extended Display Information Data", Fall, 2009.*

* cited by examiner

*Primary Examiner* — Seokyun Moon
*Assistant Examiner* — Peijie Shen
(74) *Attorney, Agent, or Firm* — Treyz Law Group; G. Victor Treyz; Jason Tsai

(57) ABSTRACT

A user may couple an external display to an electronic device using a communications path. Extended display identification data or other information on the capabilities of the external display may be provided to the electronic device over the communications path. The extended display identification data may include a list of timing elements including display parameters such as a horizontal active pixel count, a vertical active pixel count, and a pixel clock. The electronic device may tag the timing elements with their type and may flag certain timing elements as being native to the display. A scoring function may then be used to rate each timing element. A scored list of timing elements may be sorted by score. The sorted scored list may be filtered to remove inappropriate timing elements. The electronic device may automatically use a selected one of the filtered timing elements in displaying information on the external display.

19 Claims, 4 Drawing Sheets

METHODS FOR EXTERNAL DISPLAY RESOLUTION SELECTION

BACKGROUND

This relates generally to displays, and more particularly, to techniques for selecting an appropriate display resolution when an electronic device is using an external display.

Electronic devices such as computers and cellular telephones often contain displays. Internal device displays may often be relatively small. Many electronic devices allow a user to display information on external display to take advantage of the potentially larger size and enhanced viewing position available when using an external display.

External displays may vary significantly in their capabilities. This can pose challenges in situations in which a user desires to use an external display. If care is not taken, the resolution that a device uses to supply output to an external display will not be well matched to the supported resolutions of the external display.

It would therefore be desirable to be able to provide improved techniques for selecting a resolution to be used in displaying information on an external display.

SUMMARY

A user may couple an external display to an electronic device using a communications path. The communications path may be used in forming a communications link between the external display and the electronic device. The link may have an associated bandwidth.

Extended display identification data or other information on the capabilities of the external display may be provided to the electronic device over the communications path. The extended display identification data may include a list of timing elements (sometimes referred to as display resolutions). Each timing element may include display parameters such as a horizontal active pixel count, a vertical active pixel count, a pixel clock and other parameters associated with the operation of the external display.

The electronic device may tag timing elements with their type. For example, the device may tag timing elements as being established timings, standard timings, or detailed timings. The device may also tag Consumer Electronics Association (CEA) timing elements.

Certain timing elements may be more likely than others to be appropriate for displaying information on the external display. For example, the first-listed detailed timing element may be more likely than other timing elements to be associated with a native (preferred) display resolution. Accordingly, the electronic device may flag those timing elements as being preferred.

After tagging timing elements with their types and flagging preferred timing elements, the electronic device may use process the timing elements using a scoring function. The scoring function may be used to rate each timing element based on its appropriateness for use in displaying information on the external display.

A resulting scored list of timing elements may be sorted by score. The sorted scored list may be filtered to remove inappropriate timing elements. For example, timing elements having pixel clocks that exceed the bandwidth of the communications link and having frame buffer requirements that exceed the frame buffer capabilities of display driver circuitry in the electronic device may be removed from the sorted scored list of timing elements.

The electronic device may automatically use a selected one of the timing elements in the filtered list in displaying information on the external display or may provide a user with an interactive opportunity to select one of these timing elements.

Further features of the invention, its nature and various advantages will be more apparent from the accompanying drawings and the following detailed description of the preferred embodiments.

DETAILED DESCRIPTION

Figure 1:
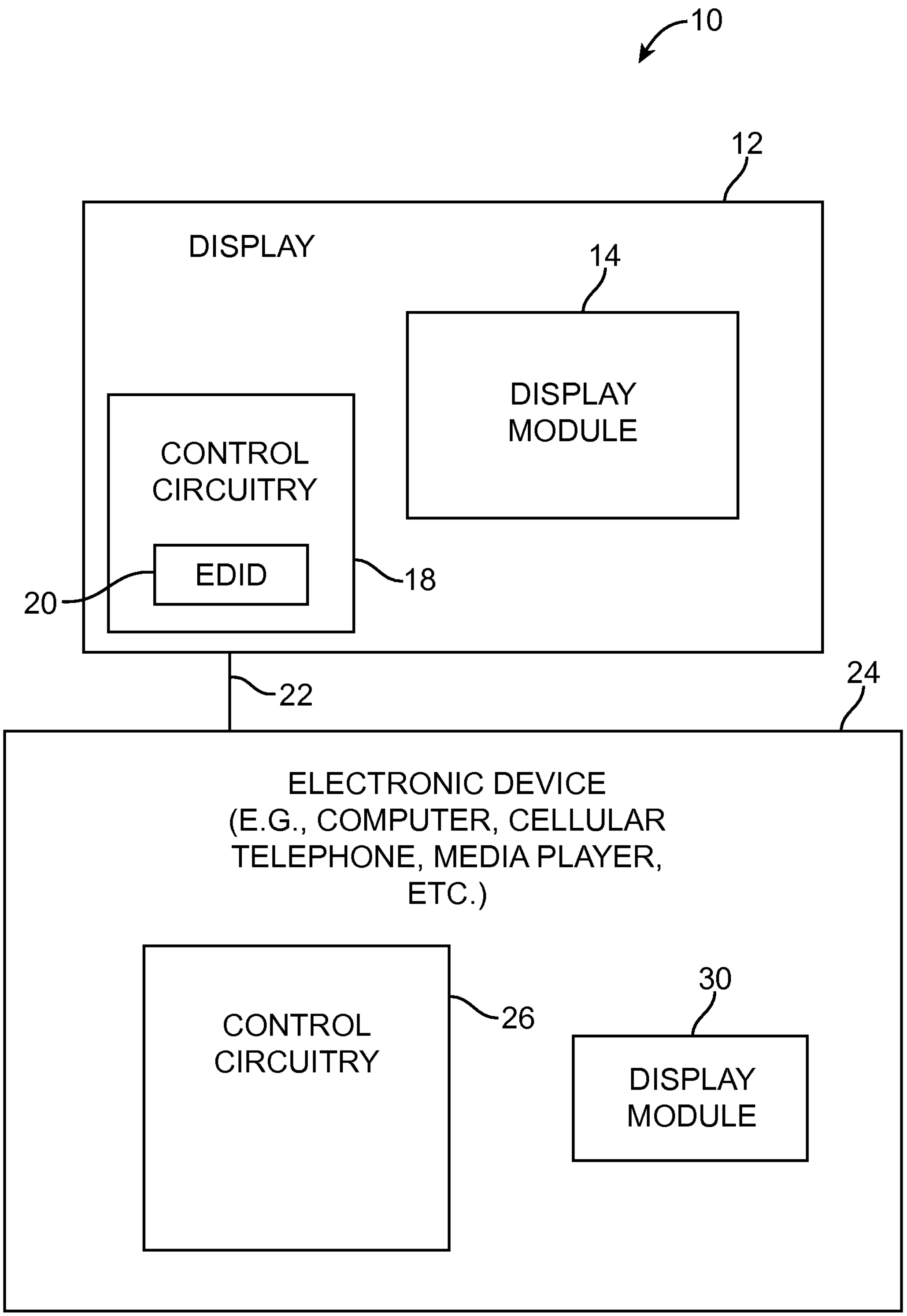
FIG. 1 is a diagram of a system including an external display and an electronic device that displays information on the external display.

FIG. 1 is a diagram of an illustrative system in which a device may display information on an external display. As shown in FIG. 1, system 10 may include an electronic device such as electronic device 24 and an external display such as external display 12. Display 12 may be coupled to device 24 by communications path 22.

Display 12 may be a television, a computer monitor, a projector, or any other suitable equipment for displaying visual information. Display 12 may include control circuitry 18 for displaying information on display module 14. Display 12 may use a display module of any suitable type. For example, display 12 may be a liquid crystal display, an organic light-emitting diode display, a plasma display, a cathode ray tube display, an electrowetting display, an electrophoretic display, or a display that uses other display technologies.

Control circuitry 18 may contain circuits such as memory, processors, application specific integrated circuits, and other storage and processing circuitry. Communications circuitry in control circuitry 18 may be used for communicating with communications circuitry in control circuitry 26 of electronic device 24 over path 22. Control circuitry 26 of electronic device 24 may contain memory, processors, application specific integrated circuits, and other storage and processing circuitry. Display driver circuitry within control circuitry 26 may be used to display information internally using display module or externally using display 12.

Path 22 may be, for example, a cable having opposing ends with connectors. The connectors may mate with corresponding connectors in display 12 and device 24. The cable may be a display cable such as a High-Definition Multimedia Interface (HDMI) cable, a DisplayPort® cable, a Digital Visual Interface (DVI) cable, Video Graphics Array (VGA) cable, or other display cable. If desired, communications path 22 may include an optical cable or a wireless path. Configurations in which cable 22 is an electrical cable may sometimes be described herein as an example.

Electronic device 10 may be a portable electronic device such as a laptop computer, a tablet computer, a somewhat smaller device such as a wrist-watch device, pendant device, headphone device, earpiece device, or other wearable or miniature device, a cellular telephone, or a media player. Device 10 may also be a television, a set-top box, a desktop computer, a computer monitor into which a computer has been integrated, or other suitable electronic equipment.

Device 10 may have an internal display such as display module 30. When it is desired to display information for a user of device 10 using display module 30, control circuitry 26 may produce output for display module 30. When it is desired to display information externally using external display 12, control circuitry 26 may transmit the information that is to be displayed to control circuitry 18 of display 12. Control circuitry 18 of display 12 may then use internal display driver circuitry to display the information on display module 14.

Different displays may have different capabilities. For example, one display may support a display timing (sometimes referred to as a display resolution) of 640 pixels×480 pixels at a 60 Hz refresh rate, whereas another display may support a display timing of 1024×768 at 60 Hz. If control circuitry 26 of device 24 does not use an appropriate display timing for display module 14 when transmitting output to display 12, display 12 will not operate properly and the desired information from device 24 will not be displayed on display module 14.

Control circuitry 18 may maintain information on the supported display timings for display 12 (i.e., supported resolutions) using stored information 20. With one suitable arrangement, which is sometimes described herein as an example, stored display capabilities information 20 may use a structure such as the extended display identification data (EDID) structure to maintain information on the capabilities of display 12. This is, however, merely illustrative. Other formats may be used to store information on the display timings supported by display 12, if desired.

When a user wishes to view information on external display 12, the user may couple display 12 to device 24 using path 22. Device 24 may, in response to being coupled to display 12, obtain information from display 12 on its capabilities. For example, device 24 may request that display 12 provide device 24 with information on the capabilities of display 12. Display 12 may respond to the request from the device by providing display capabilities information such as EDID information 20.

Control circuitry 26 in device 24 can receive and process the requested information on the capabilities of display 12. For example, control circuitry 26 may extract timing elements from EDID information 20. The timing elements identify which display timings (resolutions) display 12 should theoretically support.

In practice, not all of the timing elements that are provided by display 12 to device 24 will correspond to display resolutions that are actually supported by display 12. Some display resolutions will also be more appropriate than others in displaying typical content from device 24. Moreover, system limitations such as the bandwidth available in the communications link associated with path 22 and the hardware capabilities of device 24 (e.g., the size of the frame buffer in the display driver circuitry of control circuitry 26) may restrict which timing elements are appropriate to use in displaying information on display 12. To ensure that control circuitry 26 identifies appropriate settings to use in displaying information on display 12, control circuitry 26 can score each potential timing element that is received from display 12 (e.g., each timing element in the EDID data structure) using attributes of that timing element. The timing elements can then be filtered based on their scores to determine which timing elements are appropriate for use by electronic device 24.

In general, any type of data structure or data format may be used by display 12 to convey information about the capabilities of display 12 to other equipment. Illustrative scenarios in which display capability information is conveyed in the form of extended display identification data (EDID) information are sometimes described herein as an example. The use of EDID information to convey information on display capabilities is, however, merely illustrative.

Figure 2:
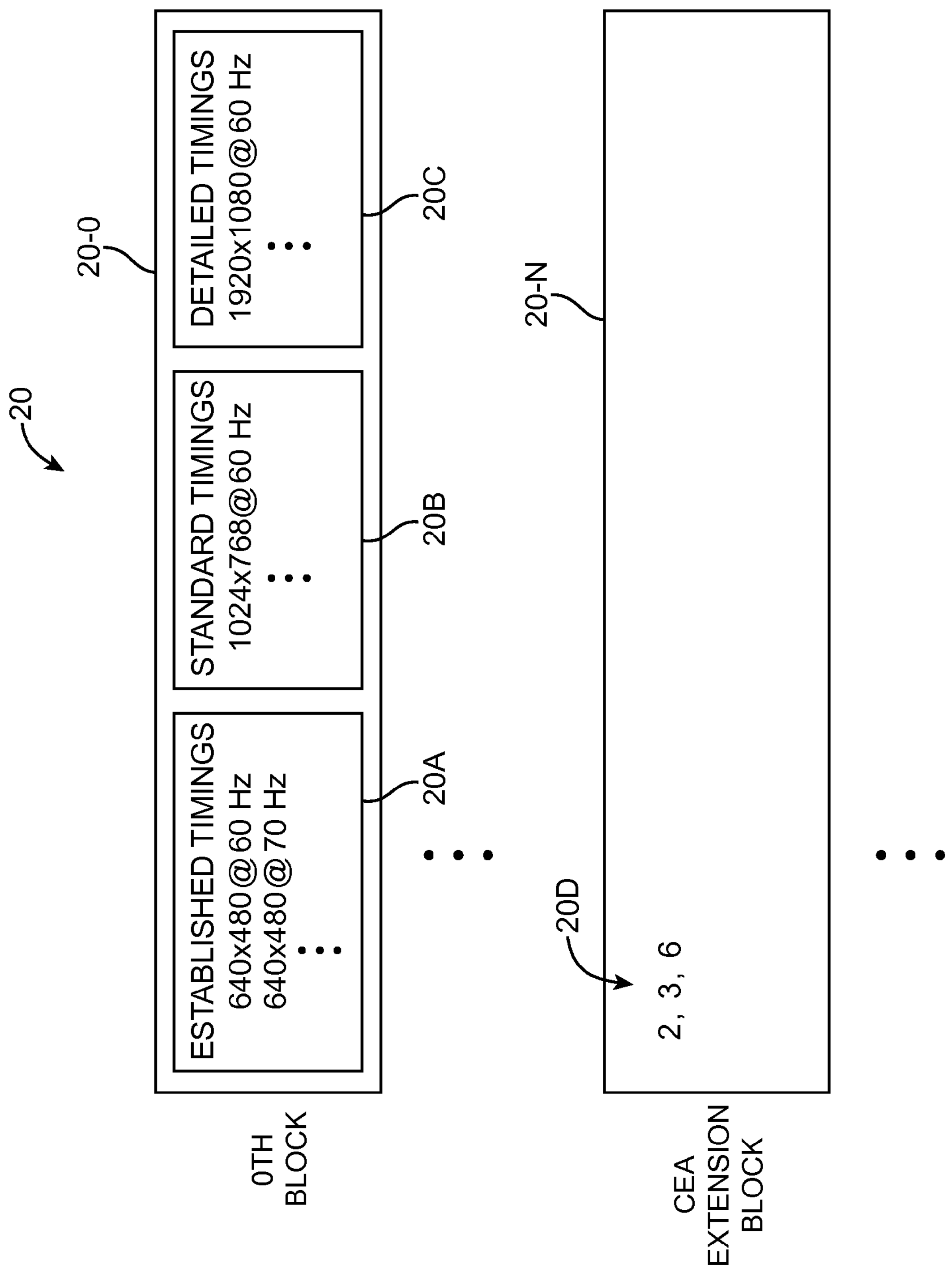
FIG. 2 is a diagram showing blocks of extended display identification data that may be provided by an external display to an electronic device in in accordance with an embodiment of the present invention.

Illustrative EDID information 20 that may be maintained by display 12 is shown in FIG. 2. As shown in FIG. 2, EDID information 20 may include multiple blocks of data such as EDID block 20-0 and EDID block 20-N. Block 20-0 (sometimes referred to as the $0^{th}$ block) may include established timings information 20A, standard timings information 20B, and detailed timings information 20C. Established timings 20A may include legacy timings such as 640 pixels×480 pixels at 60 Hz, 640×480@70 Hz, etc. Standard timings 20B may include standard resolutions that are more commonly used in modern displays such as 1024×768@60 Hz. A manufacturer of a given display may also include one or more detailed timing elements (detailed timings information 20C) corresponding to display timings that are specifically supported by that given display.

The Consumer Electronics Association (CEA) has created an indexed list of common timing elements. In block 20-N, display 12 may maintain information on which of these CEA timing elements are supported by display 12. CEA timing elements may, for example, be listed using CEA timing element indices (CEA identifiers). In the example of FIG. 2, CEA block 20-N includes three CEA timing elements. As shown in FIG. 2, the timing element information in CEA block 20-N indicates that display 12 supports the CEA timing element associated with CEA timing element index 2, the CEA timing element associated with CEA timing element index 3, and the CEA timing element associated with CEA timing element index 6. Additional or different established timings, standard timings, detailed timings, and CEA timings may be supported if desired. The example of FIG. 2 is merely illustrative.

It can be cumbersome to present a user of device 26 with too many choices of available display timings. Accordingly, rather than displaying all available timing elements, device 24 may rank timing elements to assist the user in selecting a satisfactory timing element. If desired, device 24 may use the ranked timing elements to present a shortened list of available timings to a user from which the user may select a desired timing. Device 24 may also be configured to make an automatic display timing selection from the ranked timing elements. Device 24 may, for example, automatically use the highest-ranked timing element, thereby avoiding the need for user input.

Any suitable scoring scheme may be used when ranking the available timings from the EDID blocks. A flow chart of steps involved in implementing an illustrative scoring function using control circuitry 26 is shown in FIG. 3.

Figure 3:
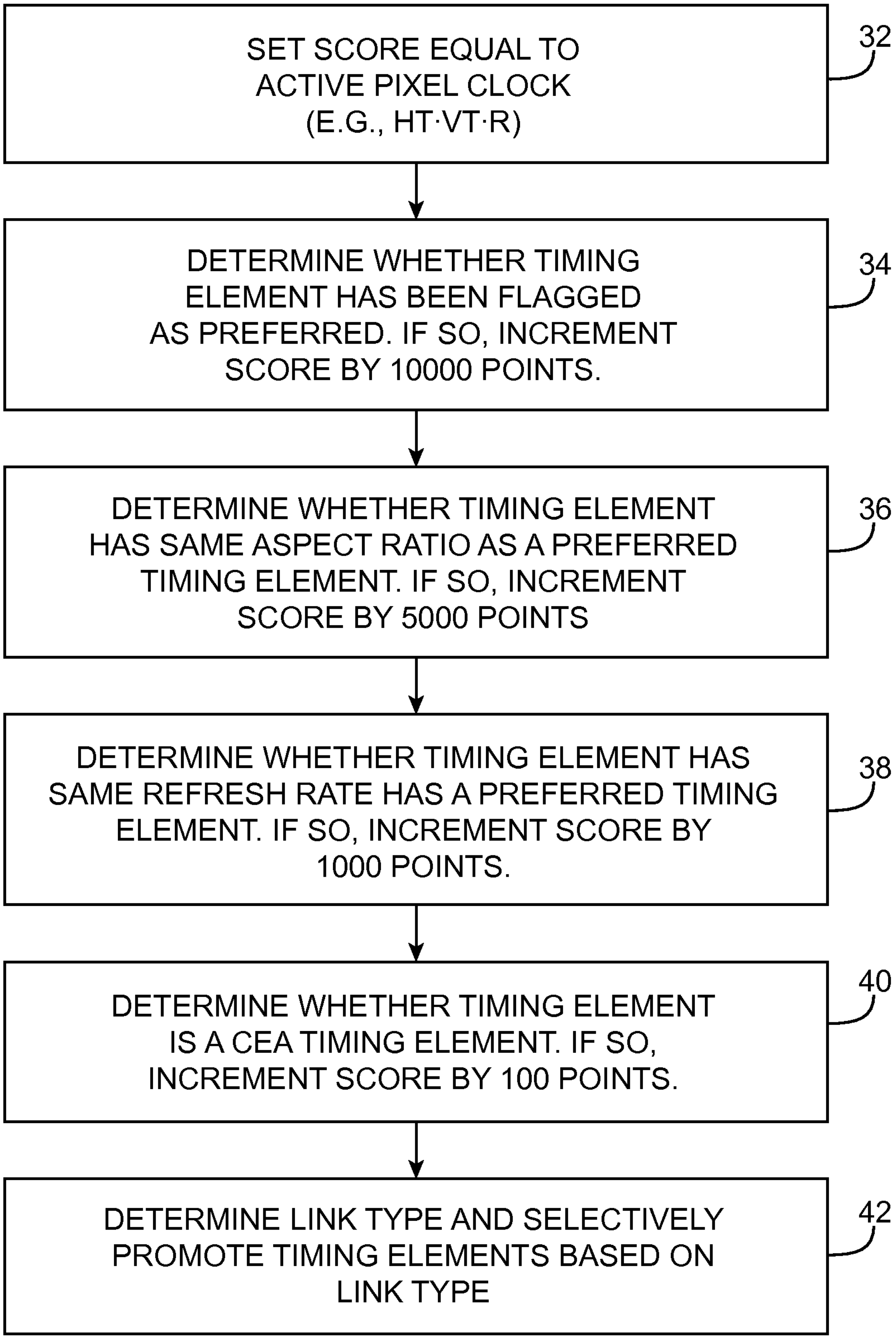
FIG. 3 is a flow chart of illustrative steps involved in assigning a score to a display resolution to determine whether or not to use the display resolution in displaying information from an electronic device on an external display.

The operations of FIG. 3 may be performed on each display timing that is to be scored. Each timing element may include timing parameters such as HA (horizontal active pixel count), HFP (horizontal front porch), HSW (horizontal sync width), HBP (horizontal back porch), HsyncP (horizontal sync polarity), VA (vertical active pixel count), VFP (vertical front porch), VSW (vertical sync width), VBP (vertical back porch), VsyncP (vertical sync polarity), and pixel clock. There are interrelationships between timing element parameters. For example, the pixel clock for a given timing element is equal to the product of the refresh rate R, the total number of horizontal pixels HT, and the total number of vertical pixels VT. The value of HT is equal to the sum of HA, HFP, HSW, and HBP. The value of VT is equal to the sum of VA, VFP, VSW, and VBP. In general, each timing element will have a full set of these timing parameters. In the illustrative example of FIG. 2, only some of these timing element parameters are shown for each timing element (i.e., HA, VA, and R) to avoid over-complicating the drawings.

At step 32, the timing element scoring function may set the value of scoring parameter SCORE to the active pixel clock divided by a scaling factor (i.e., SCORE may be made equal to the product of HT, VT, and R divided by a scaling factor of $10^6$). As an example, the value of SCORE for a timing element with horizontal, vertical, and refresh parameters of 1920, 1080, and 60 Hz, respectively, is 124 points.

Some types of timing elements are more likely than others to be appropriate for use in displaying information on display 14. For example, standard timings 20B are generally more likely to correspond to satisfactory actual supported timings than established timings 20A. In theory, established timings 20A should be fully supported by display 12, because established timings 20A are included in EDID information 20. In practice, however, a manufacturer of a given display may sometimes include a legacy timing in established timings 20A, even though the legacy timing is not supported by the given display. Detailed timings 20C, and, particularly, the first listed detailed timing in detailed timings 20C, may be more likely than standard timings 20B to correspond to a satisfactory supported timing for the display. CEA timings 20D are likewise more likely than standard timings 20B to correspond to an appropriate supported timing for the display.

During timing element processing operations, device 24 may use control circuitry 26 to identify which timing elements in EDID information 20 are most likely to actually be supported by display 12 and are most likely to exhibit optimum performance. These "preferred" (i.e., "native") timing elements can be flagged. During the operations of step 34, control circuitry 26 may use the scoring function to identify whether the timing element that is being processed has been flagged as being preferred. In response to identifying that the timing element is a preferred timing element, the value of SCORE for the timing element may be incremented by a predetermined amount (e.g., 10000 points or other suitable value).

At step 36, control circuitry 26 may use the scoring function to determine whether the timing element has an aspect ratio (e.g., an HT/VT value) that is the same as that of a preferred timing element. If the timing element does have an aspect ratio that matches the aspect ratio of a preferred timing element, the value of SCORE for the timing element may be incremented by a predetermined amount (e.g., 5000 points or other suitable value).

At step 38, control circuitry 26 may use the scoring function to determine whether the timing element has a refresh rate R that is the same as that of a preferred timing element. If the timing element does have a refresh rate value that matches the refresh rate of a preferred timing element, the value of SCORE for the timing element may be incremented by a predetermined amount (e.g., 1000 points or other suitable value).

At step 40, control circuitry 26 may use the scoring function to determine whether the timing element is a CEA timing element (i.e., whether the timing element was contained within CEA block 20-N of EDID information 20). If the timing element is a CEA timing element, the value of SCORE for the timing element may be incremented by a predetermined amount (e.g., 500 points or other suitable value).

At step 42, control circuitry 26 may use the scoring function to determine the type of communications link that has been established by control circuitry 26 and 18 between device 24 and display 12 and may use this information to adjust the value of SCORE. Examples of link types that may be established over communications path 22 include a High-Definition Multimedia Interface (HDMI) link, a DisplayPort® link, a Digital Visual Interface (DVI) link, and a Video Graphics Array (VGA) link. Other types of link may be used if desired. Upon ascertaining the link type that is being used by device 24, control circuitry 26 may adjust SCORE accordingly. Because displays that use HDMI links are more likely to prefer CEA-based modes of operation than displays that use DisplayPort, DVI, or VGA, control circuitry 26 may, for example, increase the value of SCORE if the timing element is a CEA timing element and the detected link type is HDMI or may increase the value of SCORE if the timing element is a non-CEA timing element and the detected link type is a non-HDMI link type such as DisplayPort, DVI, or VGA.

Other scoring criteria may be used in scoring timing elements in display capability information 20 if desired. The illustrative scoring technique of FIG. 3 is merely illustrative.

Figure 4:
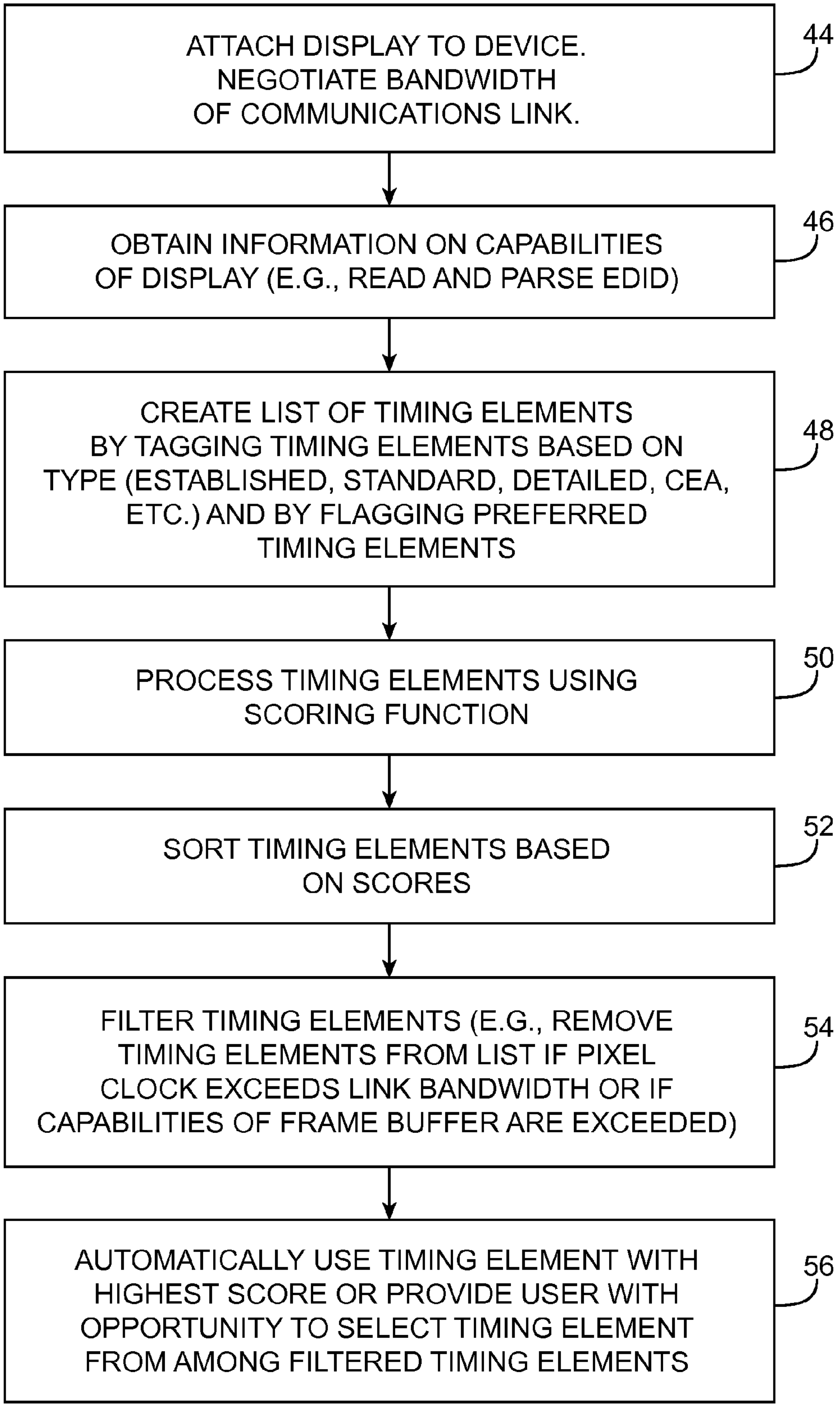
FIG. 4 is a flow chart of illustrative steps involved in selecting and using a display resolution for displaying information on an external display in accordance with an embodiment of the present invention.

FIG. 4 is a flow chart of illustrative steps involved in identifying and using an appropriate timing for device 24 to use in displaying information on external display 12.

At step 44, a user may couple device 24 and external display 12 using communications path 22. Once coupled by path 22, a communications link such may be formed between control circuitry 26 of device 24 and control circuitry 18 of display 12. In some types of communications links such as a DisplayPort link, the bandwidth associated with communications over the link may be negotiated between control circuitry 26 and control circuitry 18. The bandwidth of the link over path 22 may vary depending on the quality of path 22. If, for example, path 22 is a cable with a low bandwidth, the negotiated bandwidth of the link between device 24 and display 12 will be low. If path 22 is a high bandwidth cable, the negotiated bandwidth of the link between device 24 and display 12 will be high. An example of a negotiated bandwidth for the link between device 24 and display 12 is 3.24 Gbps. This is merely illustrative. Any suitable communications link bandwidth may be negotiated between device 24 and display 12 if desired.

At step 46, device 24 may obtain information from display 12 on the capabilities (i.e., the purported capabilities) of display 12. For example, control circuitry 26 may use protocols such as Display Data Channel (DDC) protocols to request that control circuitry 18 provide information on the capabilities of display 12 such as EDID information 20 to control circuitry 26. Display 12 may maintain EDID information 20 in storage (e.g., non-volatile memory in control circuitry 18). In response to receiving an EDID request from device 24, display 12 may transmit the requested EDID information to device 24. Device 24 may use control circuitry 26 to receive and process the transmitted EDID information. For example, control circuitry 26 may be used to parse the EDID information that has been received by extracting information such as timing elements 20A, 20B, 20C and 20D of FIG. 2 from the EDID information. The extracted timing elements may be saved in the form of a list of possible timing elements for control circuitry 26 to use.

At step 48, control circuitry 26 may categorize the timing elements in the list by tagging timing elements with their type and by flagging those timing elements that are preferred by the display (i.e., timing elements corresponding to the display's "native" resolution). For example, control circuitry 26 can label timing elements from EDID block 20-0 as being "established" timings 20A, as being "standard" timings 20B, or as being "detailed" timings 20C and may label timings from EDID block 20-N as being "CEA" timings 20D. Timing elements that may be flagged as being "preferred" include the first listed detailed timing element and all CEA timing elements in block 20-N that have an associated high native bit.

At step 50, each of the timing elements in the labeled list of timing elements may be processed using a scoring function such as the scoring function of FIG. 3. Scores may be saved to create a scored timing element list. After scoring the timing elements, the timing elements may be sorted based on their scores (step 52), thereby creating a sorted list of timing elements.

At step 54, control circuitry 26 may remove timing elements from the sorted list that are not appropriate to use because their bandwidth requirements exceed the available bandwidth of the link between display 12 and device 24. If, as an example, the negotiated bandwidth between device 24 and display 12 is 1 Gbps, control circuitry 26 may filter out all timing elements having pixel clocks greater than 1 GHz). The display driver circuitry of control circuitry 26 may have a frame buffer that is used in outputting information to be displayed on display 12. If the amount of information that is being displayed on display 12 when using a particular timing element would cause the display driver circuitry to overload the frame buffer, that timing element can be removed from the sorted list.

After filtering the timing element list to remove inappropriate timing elements based on the capabilities of the display driver circuitry in control circuitry 26 of device 24 and the capabilities of the communications link over path 22, device 24 can use an appropriate timing element to display information (e.g., text, images, and/or video) from device 24 on external display 12. For example, device 24 may use one of the remaining timing elements in the list to display information on display 12.

With one suitable arrangement, the control circuitry 26 of device 24 may perform this operation automatically, without need for input from a user. Control circuitry 26 may, for example, use the timing element at the top of the sorted list (i.e., the timing element with the highest value of SCORE). If only a single timing element remains following filtering, control circuitry 26 may use that timing element in displaying information on display 12.

With another suitable arrangement, some or all of the list of timing elements may be presented on display 30 as selectable display timing options. A user may select on an on-screen option or may otherwise interactively select which of the displayed timing elements to use in displaying information on display 12.

The foregoing is merely illustrative of the principles of this invention and various modifications can be made by those skilled in the art without departing from the scope and spirit of the invention.

What is claimed is:

1. A method for selecting a display timing to use in displaying information from an electronic device on an external display that is coupled to the electronic device over a communications link, comprising:

with control circuitry in the electronic device, obtaining information on the capabilities of the external display over the communications link, wherein the obtained information on the capabilities of the external display includes timing elements;

scoring the timing elements using a scoring function implemented on the control circuitry, wherein scoring the timing elements comprises:

computing initial scores for the timing elements based on a horizontal active pixel count, a vertical active pixel count, and a refresh rate;

incrementing the initial scores of the timing elements by a first amount based on a first increment criteria; and incrementing the initial scores by a second amount based on a second increment criteria that is different than the first increment criteria, wherein the first amount is different than the second amount;

sorting the scored timing elements based on the incremented scores to create a sorted list of timing elements;

with the control circuitry, selecting and using one of the scored timing elements in the sorted list to display information on the external display.

2. The method defined in claim 1 wherein selecting and using one of the scored timing elements comprises using the control circuitry to select one of the scored timing elements based on user input.

3. The method defined in claim 1 further comprising:

filtering the scored timing elements before selecting which of the timing elements to use in displaying the information on the external display.

4. The method defined in claim 3 wherein the communications link is characterized by a bandwidth and wherein filtering the scored timing elements comprises removing timing elements from the scored timing elements whenever the timing elements have a pixel clock that exceeds the bandwidth.

5. The method defined in claim 4 wherein the control circuitry is characterized by frame buffer capabilities and wherein filtering the scored timing elements comprises removing timing elements from the scored timing elements whenever the timing elements have frame buffer capabilities that exceed the frame buffer capabilities of the control circuitry.

6. The method defined in claim 1 further comprising:

tagging at least one of the timing elements as being a preferred timing element.

7. The method defined in claim 6 wherein tagging the timing elements comprises tagging a detailed timing element from a $0^{th}$ extended display identification block.

8. The method defined in claim 6 wherein tagging the timing elements comprises tagging Consumer Electronics Association timing elements that have high native bits.

9. The method defined in claim 6 wherein the information on the capabilities of the external display comprises extended display identification data and wherein scoring the timing elements comprises incrementing the scores for the timing elements that have been flagged as preferred.

10. The method defined in claim 9 wherein the information on the capabilities of the external display comprises extended display identification data and wherein scoring the timing elements comprises determining whether a timing element has an aspect ratio that matches an aspect ratio of a timing element that has been flagged as preferred.

11. The method defined in claim 9 wherein the information on the capabilities of the external display comprises extended display identification data and wherein scoring the timing elements comprises determining whether a timing element is a Consumer Electronics Association timing element.

12. The method defined in claim 1 wherein the communications link is characterized by a link type and wherein scoring the timing elements comprises scoring the timing elements based at least partly on the link type.

13. A method for selecting a display resolution to use in displaying information from an electronic device on an external display that is coupled to the electronic device over a communications link, comprising:

with control circuitry in the electronic device, obtaining extended display identification data from the external display over the communications link, wherein the extended display identification data includes a plurality of display resolutions;

scoring the display resolutions based at least partly on display resolution type, wherein scoring the display resolutions comprises incrementing scores for the display resolutions by different amounts at least partly based on different characteristics of the display resolutions other than horizontal active pixel count, vertical active pixel count, and refresh rate; and sorting the scored display resolutions to create a sorted list of display resolutions.

14. The method defined in claim 13 wherein the display resolutions are characterized by display resolution types including an established timing type, a standard timing type, and a detailed timing type and wherein scoring the display resolutions comprises incrementing a score for a display resolution having the detailed timing type relative to scores for display resolutions having established and standard timing types.

15. The method defined in claim 14 wherein the display resolutions are characterized by respective refresh rates and wherein scoring the display resolutions comprises scoring the display resolutions at least partly based on the respective refresh rates.

16. The method defined in claim 14 wherein the display resolutions are characterized by respective pixel clocks and wherein scoring the display resolutions comprises scoring the display resolutions at least partly based on the pixel clocks.

17. The method defined in claim 13 further comprising:

filtering the sorted list to remove display resolutions from the sorted list; and with the control circuitry in the electronic device, automatically selecting a display resolution from the filtered sorted list to display information on the external display over the communications list.

18. A method for selecting a display timing to use in displaying information from an electronic device on an external display that is coupled to the electronic device over a communications link, comprising:

with control circuitry in the electronic device, obtaining extended display identification data from the external display over the communications link, wherein the extended display identification data includes a plurality of timing elements, each timing element including at least a horizontal active pixel count, a vertical active pixel count, and a refresh rate; and scoring the timing elements using a scoring function implemented on the control circuitry to produce timing element scores, wherein the scoring function computes the timing element scores as a function of the horizontal active pixel count, the vertical active pixel count, and the refresh rate;

increasing the computed timing element score by a first amount when the timing element has a first characteristic;

increasing the computed timing element score by a second amount that is different than the first amount when the timing element has a second characteristic that is different than the first characteristic; and with the control circuitry, automatically selecting and using one of the scored timing elements to display information on the external display based at least partly on the timing element score for that scored timing element.

19. The method of claim 18, wherein the first and second characteristics are selected from the group consisting of having been flagged as preferred, having an aspect ratio that is the same as a preferred aspect ratio, having a timing element that is the same as a preferred timing element, and being a Consumer Electronics Association timing element.

* * * * *